United States Patent
Kojima

(10) Patent No.: US 11,981,032 B2
(45) Date of Patent: May 14, 2024

(54) ROBOT CONTROL DEVICE, METHOD AND PROGRAM FOR A RECOVERY AFTER AN OBSTRUCTION

(71) Applicant: OMRON Corporation, Kyoto (JP)

(72) Inventor: Takeshi Kojima, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 170 days.

(21) Appl. No.: 17/275,307

(22) PCT Filed: Mar. 15, 2019

(86) PCT No.: PCT/JP2019/010832
§ 371 (c)(1),
(2) Date: Mar. 11, 2021

(87) PCT Pub. No.: WO2020/188630
PCT Pub. Date: Sep. 24, 2020

(65) Prior Publication Data
US 2022/0032459 A1 Feb. 3, 2022

(51) Int. Cl.
*B25J 9/16* (2006.01)

(52) U.S. Cl.
CPC ............. *B25J 9/1664* (2013.01); *B25J 9/163* (2013.01); *B25J 9/1666* (2013.01)

(58) Field of Classification Search
CPC ........ B25J 9/1664; B25J 9/163; B25J 9/1666; B25J 9/1676; G05B 2219/40476; G05B 2219/40497; G05B 2219/40543; G05B 2219/50112
See application file for complete search history.

(56) References Cited

U.S. PATENT DOCUMENTS

| | | |
|---|---|---|
| 2006/0009878 A1 | 1/2006 | Kobayashi et al. |
| 2010/0241289 A1* | 9/2010 | Sandberg ............. G06T 1/0014 701/2 |
| 2011/0213497 A1 | 9/2011 | Nair |

(Continued)

FOREIGN PATENT DOCUMENTS

| | | |
|---|---|---|
| JP | H06-102917 A | 4/1994 |
| JP | H07-028520 A | 1/1995 |

(Continued)

OTHER PUBLICATIONS

Merkt, W., et al., "Robust Shared Autonomy for Mobile Manipulation with Continuous Scene Monitoring," Aug. 2017, 13th IEEE Conference on Automation Science and Engineering (CASE), pp. 130-137 (Year: 2017).*

(Continued)

*Primary Examiner* — Ian Jen
*Assistant Examiner* — Karston G. Evans
(74) *Attorney, Agent, or Firm* — Morgan, Lewis & Bockius LLP

(57) ABSTRACT

When occurrence of an obstruction has been detected during action of a robot, a path generation section acquires environment information at a periphery of the robot after obstruction occurred, robot specification information, and safe pose information representing a recovery-pose for the robot, and generates a path of the robot from a pose after obstruction occurred to a safe pose based on the acquired information.

20 Claims, 18 Drawing Sheets

(56) References Cited

U.S. PATENT DOCUMENTS

| | | | |
|---|---|---|---|
| 2015/0266182 A1* | 9/2015 | Strandberg | B25J 9/1676 |
| | | | 700/255 |
| 2019/0070728 A1* | 3/2019 | Wertenberger | B25J 9/1628 |
| 2019/0086549 A1* | 3/2019 | Ushani | G05D 1/0088 |
| 2020/0184196 A1* | 6/2020 | Foster | B25J 9/1697 |
| 2020/0278681 A1* | 9/2020 | Gier | G05D 1/0246 |
| 2021/0169049 A1* | 6/2021 | Xiao | G06V 20/10 |

FOREIGN PATENT DOCUMENTS

| | | |
|---|---|---|
| JP | H08-294886 A | 11/1996 |
| JP | H09-212225 A | 8/1997 |
| JP | H10-097305 A | 4/1998 |
| JP | 2006-012074 A | 1/2006 |
| JP | 2012-166290 A | 9/2012 |
| JP | 2013-121644 A | 6/2013 |
| JP | 2018-144171 A | 9/2018 |

OTHER PUBLICATIONS

International Search Report issued in corresponding International Patent Application No. PCT/JP2019/010832 dated Apr. 10, 2019.
Written Opinion issued in corresponding International Patent Application No. PCT/JP2019/010832 dated Apr. 16, 2019.

* cited by examiner

HYPOTHETICAL OBSTACLE

ROBOT CONTROL DEVICE, METHOD AND PROGRAM FOR A RECOVERY AFTER AN OBSTRUCTION

TECHNICAL FIELD

The present invention relates to a robot control device, a robot control method, and a robot control program.

BACKGROUND ART

In cases in which a robot has fallen into a stopped state due to colliding with an obstacle or self-interference occurring, a recovery is, for example, performed to recover the robot to a safe pose such as, for example, a home position pose of the robot. This recovery action is implemented by reverse sequence execution of a trained path, by a user operating a teach pendant (TP), or the like.

For example, there is a control method to return a robot to a home position proposed for a robot having plural different types of movement command and able to adopt different paths during a task (see Patent Document 1). In this method, in order to execute an already-executed control program in the reverse sequence, a start position for a movement command during a normal action in response to a movement command is substituted for a destination position during a reverse action. Recovery is then made to the task home position by retracing the path for normal action by executing each of the movement commands using the position arguments of the immediately previous movement command.

Moreover, a robot control method capable of recovery to a home position at whichever timing a robot has stopped at is also proposed (see Patent Document 2). In this method, when a robot performing an action stops unexpectedly while moving from a home position under an execution program based on teaching data, an action path from the home position to the stop position where the robot stopped unexpectedly is computed using the execution program and the teaching data, and a recovery to the home position is performed using a reverse path retracing the action path. In such cases, interference with an interfering object is detected from load information to operate the robot. A disengagement position to disengage from the interfering object is computed based on the load information, and a recovery path from the disengagement position to the home position is computed using the reverse path.

RELATED ART PUBLICATIONS

Patent Literature

Patent Document 1: Japanese Patent Application Laid-Open (JP-A) No. H7-28520

SUMMARY OF INVENTION

Technical Problem

However, in a state in which obstruction has occurred such as by collision with an obstacle, the robot may become entangled with the collided obstacle in a complex manner, and there are also complicated poses the robot may itself adopt. This means that often the robot is not able to recover by reverse sequence execution of a path. In cases in which recovery is not able to be achieved automatically by reverse sequence execution of a path, careful operation by a skilled user is required to recover to a safe pose without colliding again or tripping a limit switch again. This presents the problem that the time to recover from an obstruction is prolonged. Needing time to recover leads to a drop in productivity of performed tasks compared to normal actions of a robot.

In consideration of the above circumstances, an object of the present invention is to provide a robot control device, method, and program enabling recovery from an obstructed state to a safe pose in a short period of time.

Solution to Problem

In order to achieve the above objective, a robot control device of the present invention may be configured including a generation section and a control section. The generation section is configured to acquire information when occurrence of an obstruction has been detected during action of a robot, the information being environment information at a periphery of the robot after the obstruction occurred, specification information of the robot, and information of a recovery-pose for the robot, and generates a path of the robot from a pose after the obstruction occurred to the recovery-pose based on the acquired information. The control section is configured to control action of the robot based on the path generated by the generation section such that the robot adopts the recovery-pose.

In the robot control device according to the present invention, when occurrence of an obstruction has been detected during action of a robot, the generation section acquires the environment information at a periphery of the robot after obstruction occurred, the specification information of the robot, and the information of a recovery-pose for the robot, and generates a path of the robot from the pose after obstruction occurred to the recovery-pose based on the acquired information. The control section controls action of the robot based on the path generated by the generation section such that the robot adopts the recovery-pose. This enables recovery from the obstructed state to the safe pose in a short period of time.

Moreover, the generation section may acquire 3D-measurement data representing a 3D-position of each point at the periphery of the robot as the environment information after the obstruction occurred, and identify a shape and position of an object present at the periphery of the robot after the obstruction occurred based on the 3D-measurement data. Thus for an object for which information about shape and position has been given in advance, such as CAD data, the shape and position of an object after obstruction occurred can be identified even in cases in which deformation or the like has arisen due to occurrence of obstruction.

The generation section may employ 3D-information representing a shape and a position of an object present at the periphery of the robot prior to the obstruction occurring together with the environment information acquired after the obstruction occurred to identify a shape and position of an object present at the periphery of the robot after obstruction occurred. The shape and position of the object after obstruction occurred can be identified with good precision by using 3D-information about an object given in advance, such as CAD data.

The generation section may acquire 3D-measurement data representing a 3D-position of each point at the periphery of the robot as the environment information after the obstruction occurred, identify a shape and a position of the object present at the periphery of the robot based on the 3D-information for portions of the 3D-measurement data matching the 3D-information, and identify a shape and a position of the object present at the periphery of the robot based on the 3D-measurement data for portions of the 3D-measurement data where there is no matching 3D-information present. Thus the shape and the position of the object can be identified with good precision for portions where 3D-information is utilizable, and moreover the processing load can be reduced in comparison to cases using the 3D-measurement data alone for identification across all ranges.

The generation section may identify a region where the environment information after the obstruction occurred is unable to be measured as an obstacle candidate region. This enables generation of a safer path to recover from an obstructed state.

The generation section may set a cost for each region at the periphery of the robot according to a possibility of an obstacle being present, and identify whether or not an obstacle is present in the obstacle candidate region according to the cost of the obstacle candidate region. This thereby enables a path to be generated with flexible determination of whether or not an obstacle is present for a region where environment information is not able to be measured.

The generation section may display on a display device a shape and a position of an object present at the periphery of the robot after the obstruction occurred and also information representing the generated path. This enables a user to confirm the path and information about objects at the periphery of the robot prior to the robot action.

The generation section may receive correction of at least one item of the path or the shape and the position of the object present at the periphery of the robot after the obstruction occurred, or the at least one item being displayed on the display device. This enables regeneration of a path to be instructed after correction has been performed in cases in which correction is necessary.

In a case in which the path is unable to be generated, the generation section may display information on a display device related to a cause of not being able to generate the path. This enables a user to be prompted to remove a cause of not being able to generate a path.

A robot control method according to the present invention is a method including a generation section acquiring information when occurrence of an obstruction has been detected during action of a robot, this being environment information at a periphery of the robot after the obstruction occurred, specification information of the robot, and information of a recovery-pose for the robot, and generating a path of the robot from a pose after the obstruction occurred to the recovery-pose based on the acquired information, and a control section controlling action of the robot based on the path generated by the generation section such that the robot adopts the recovery-pose.

A robot control program according to the present invention is a program to cause a computer to function as a generation section and as a control section. The generation section is configured to acquire information when occurrence of an obstruction has been detected during action of a robot, the information being environment information at a periphery of the robot after the obstruction occurred, specification information of the robot, and information of a recovery-pose for the robot, and generates a path of the robot from a pose after the obstruction occurred to the recovery-pose based on the acquired information. The control section is configured to control action of the robot based on the path generated by the generation section such that the robot adopts the recovery-pose.

Advantageous Effects

The robot control device, method, and program according to the present invention enable recovery from an obstructed state to a safe pose in a short period of time by acquiring environment information after obstruction occurred and generating a path of a robot from a pose after obstruction occurred to a recovery-pose.

DESCRIPTION OF EMBODIMENTS

Figure 1:
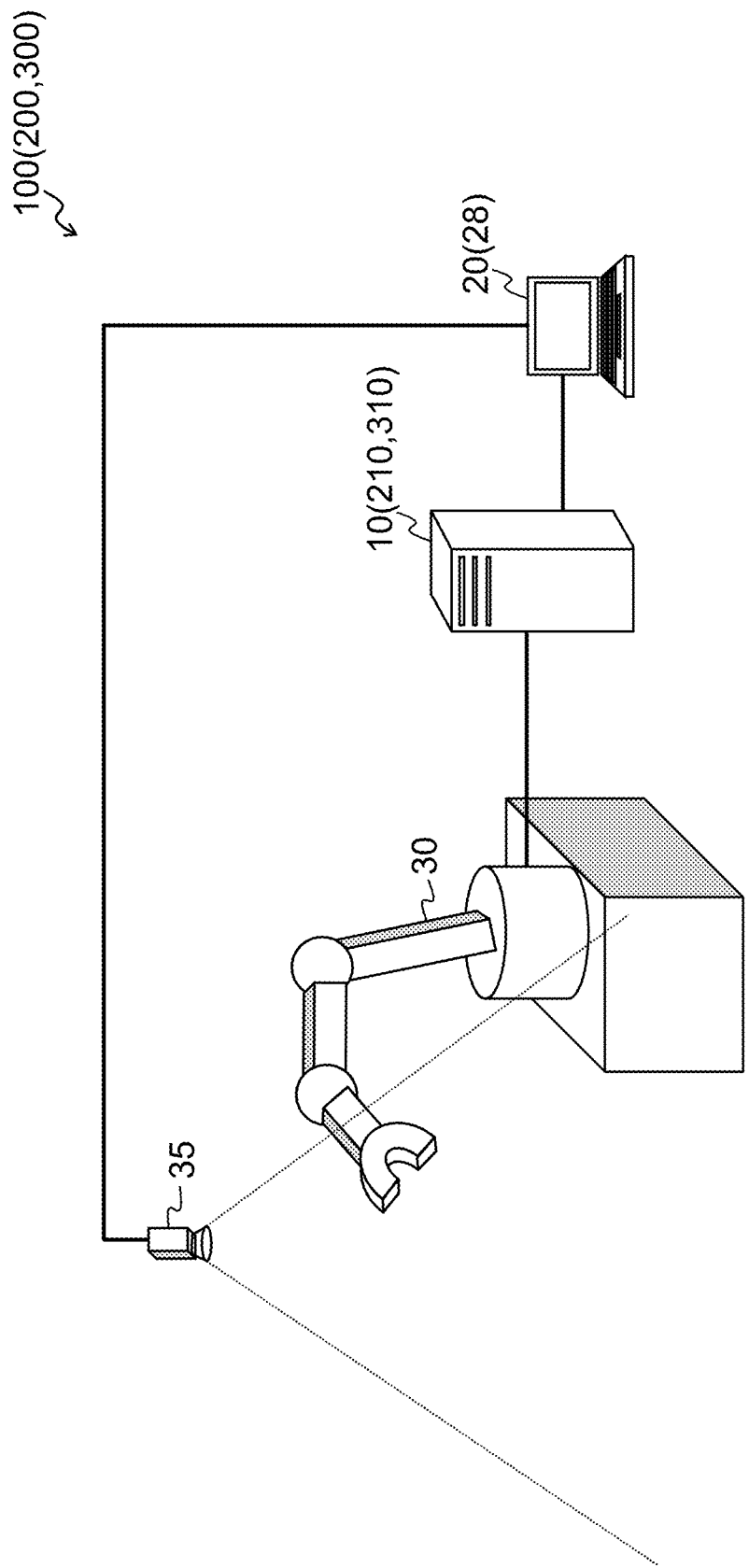
FIG. 1 is a diagram illustrating a schematic configuration of a robot control system according to a first to third exemplary embodiment.

Explanation follows regarding examples of exemplary embodiments of the present invention, with reference to the drawings. Note that configuration elements and parts that are either the same or equivalent are appended with the same reference numeral in each of the drawings. Moreover, the dimensions and proportions in the drawings may be exaggerated to facilitate explanation, and do not necessarily conform to actual proportions.

Moreover, explanation in each of the following exemplary embodiments will mainly focus on parts related to the present invention, namely on parts related to a recovery action when an obstruction of the robot has occurred, and for normal actions, such as pick-and-place of a workpiece, explanation will only be given regarding parts related to the present invention.

First Exemplary Embodiment

As illustrated in FIG. 1, a robot control system 100 according to the first exemplary embodiment is configured including a robot control device 10, an operation terminal 20, a robot 30, and a 3D-sensor 35.

The robot 30 is, for example, a vertical articulated robot with a configuration having the six degrees of freedom required for actions in three-dimensional space. Note that the robot 30 may be provided with seven degrees of freedom, in which a redundant degree of freedom is added to the six degrees of freedom. The action of the robot 30 is controlled according to a path generated by the robot control device 10.

Moreover, sensors (not-illustrated in the drawings) are provided to the robot 30 to detect the occurrence of obstruction, such as collision with an obstacle or the like. The action of the robot 30 is stopped when the occurrence of obstruction has been detected, and current pose information indicating the current pose of the robot 30 itself is notified to the robot control device 10 together with notification that an obstruction has occurred.

Note that for a reference position of the fingers of the robot 30 (the side for attaching a tool such as a robot hand) having a position (x, y, z) and an orientation (roll, pitch, yaw), the pose of the robot 30 is expressed by a sequence (J1, J2, . . . , JN) of values (rotation angles) of each joint from a first joint to an $N^{th}$ joint of the robot 30 (wherein N is the number of joints in the robot).

The operation terminal 20 is an information processing device to input information and may, for example, be implemented by a personal computer or teach pendant (TP). The operation terminal 20 receives input of information needed to generate a path and to control the robot, and inputs the received information to the robot control device 10. Environment information, robot specification information, and safe pose information is included in the information needed for path generation and robot control. Each of these items of information will be described later.

The 3D-sensor 35 measures the environment at the periphery of the robot 30 including the action region of the robot 30, and outputs the results of measurement. The 3D-sensor 35 may, for example, be implemented by a 3D-camera, laser radar, or the like. The 3D-sensor 35 in the present exemplary embodiment measures point cloud data representing a 3D-position of each point in the peripheral environment. The 3D-sensor 35 inputs the point cloud data resulting from measurement into the operation terminal 20. Note that the point cloud data is an example of 3D-measurement data of the present invention, and the 3D-measurement data is not limited to being point cloud data and may be DepthMap, line scan data, or the like.

When notified by the robot 30 that an obstruction has occurred, the robot control device 10 generates a path to recover the robot 30 to a safe pose that had been instructed, and controls a recovery action of the robot 30 based on the generated path. Note that paths in the present exemplary embodiment are a time series arrangement of poses of the robot 30 when the reference position of the fingers of the robot 30 is moved from a freely selected start point to an end point.

Figure 2:
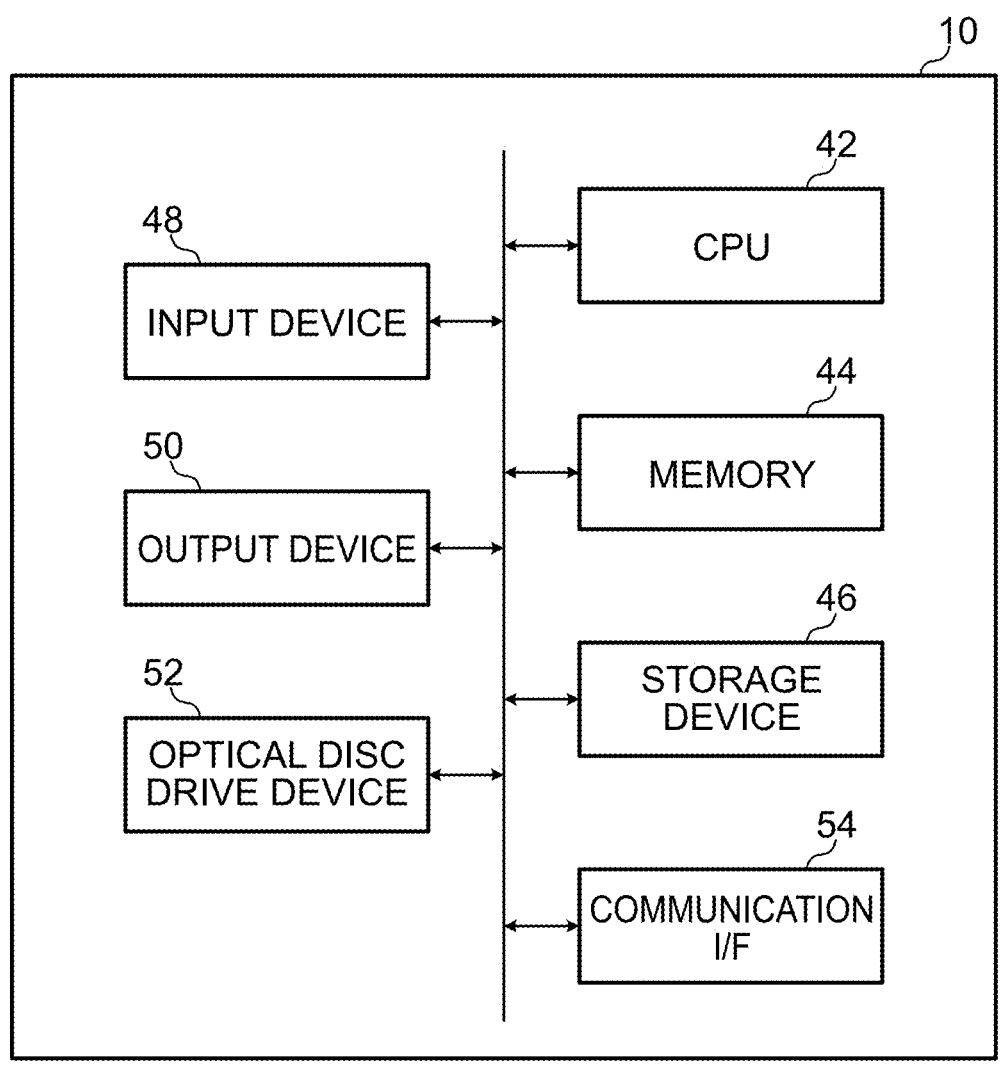
FIG. 2 is a block diagram illustrating a hardware configuration of a robot control device according to the first to third exemplary embodiment.

The robot control device 10 may be implemented by a personal computer or by an industrial computer. FIG. 2 is a block diagram illustrating a hardware configuration of the robot control device 10 according to the present exemplary embodiment. As illustrated in FIG. 2, the robot control device 10 includes a central processing unit (CPU) 42, memory 44, a storage device 46, an input device 48, an output device 50, an optical disc drive device 52, and a communication interface (I/F) 54. The configuration elements are connected together through a bus so as to be capable of communicating with each other.

A robot control program for executing robot control processing is stored in the storage device 46. The CPU 42 is a central processing unit for executing various programs and controlling each of the configuration elements. Namely, the CPU 42 reads programs from the storage device 46, and executes the programs using the memory 44 as a workspace. The CPU 42 controls each of the configuration elements and performs various arithmetic processing according to the programs stored on the storage device 46.

The memory 44 is configured from random access memory (RAM), and is employed as workspace to temporarily store programs and data. The storage device 46 is configured by read only memory (ROM) and a hard disk drive (HDD) or solid state drive (SSD), and is stored with various programs including an operating system, as well as various data.

The input device 48 is, for example, a device such as a keyboard or mouse used for various input. The output device 50 is, for example, a device such as a display or a printer for outputting various information. The output device 50 may also function as the input device 48 by adopting a touch panel display configuration. The optical disc drive device 52 performs reading of data stored on various recording media (for example a CD-ROM or a Blu-Ray disc), and performs writing of data to the recording media.

The communication interface 54 is an interface for communication with other machines, and employs a standard such as, for example, Ethernet (registered trademark), FDDI or Wi-Fi (registered trademark).

Note that the hardware configuration of the operation terminal 20 is also substantially similar to the configuration illustrated in FIG. 2, and so explanation thereof will be omitted.

Next, explanation follows regarding a functional configuration of the robot control device 10 and the operation terminal 20 according to the first exemplary embodiment.

Figure 3:
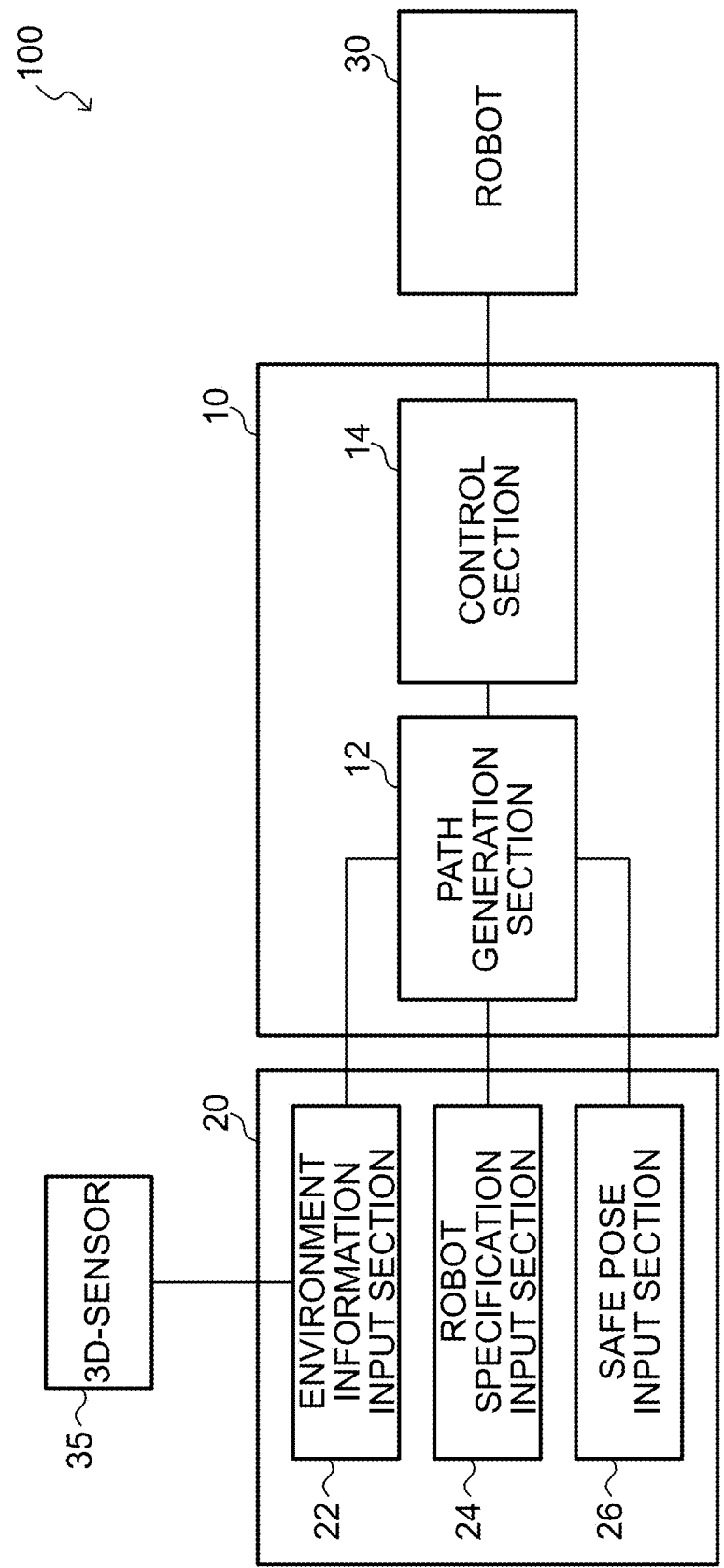
FIG. 3 is a functional block diagram of a robot control system according to the first exemplary embodiment.

FIG. 3 is a block diagram illustrating an example of a functional configuration of the robot control system 100. As illustrated in FIG. 3, the operation terminal 20 includes as functional configuration, an environment information input section 22, a robot specification input section 24, and a safe pose input section 26.

The environment information input section 22 receives input of environment information representing the environment at the periphery of the robot 30 including the action region of the robot 30, and inputs these to the robot control device 10. The environment information input section 22 receives measurement results output as environment information from the 3D-sensor 35. Moreover, the environment information input section 22 receives as environment information the input of CAD data, which is 3D-information representing shapes and positions of obstacles such as peripheral equipment, shelves, containers, and the like. Note that such an obstacle is an example of an object of the present invention.

The robot specification input section 24 receives input of robot specification information representing the specification of the robot 30 and inputs this to the robot control device 10. The robot specification information includes, for example, shape information for the robot, and kinematic information such as a home position for the fingers, joint arrangement, etc., and joint information such as limit angles, rotation velocities, and the like for each of the joints.

The safe pose input section 26 receives input of safe pose information representing a safe pose for recovery of the robot 30 when an obstruction has occurred, and inputs this to the robot control device 10. The safe pose may be a pose of a home position of the robot 30 (for example, when the angle of each of the joints is 0 degrees), or, depending on the peripheral environment, a pose adopted when recovery is made to a position where there are no obstacles present at all.

Moreover, as illustrated in FIG. 3, the robot control device 10 also includes as functional configuration a path generation section 12 and a control section 14. Each of the functional configurations is implemented by the CPU 42 reading the robot control processing stored in the storage device 46, expanding the program in the memory 44, and executing the program. Note that the path generation section 12 is an example of a generation section of the present invention, and the control section 14 is an example of a control section of the present invention.

Figure 4:
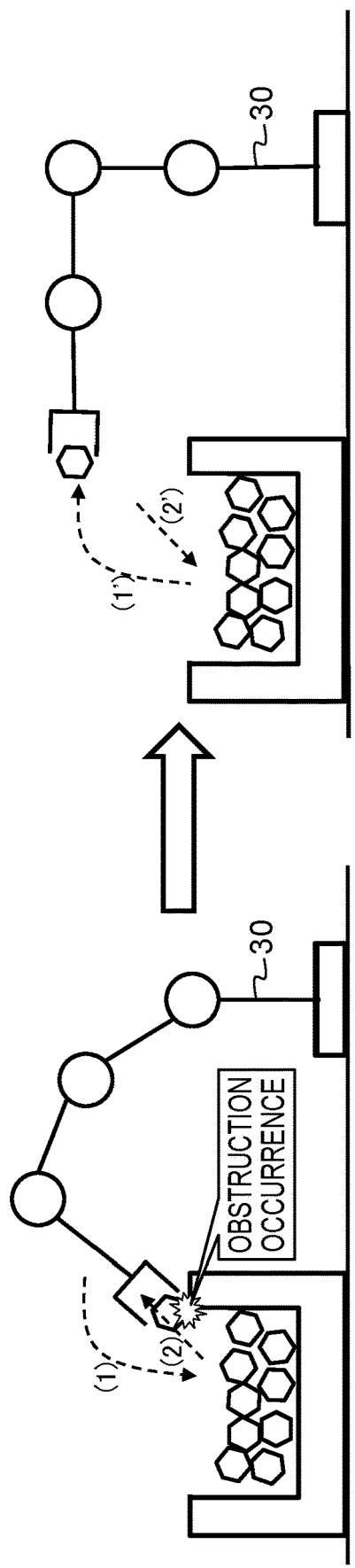
FIG. 4 is a diagram to explain a case in which a recovery action is performed by reverse sequence execution of a path.

Consider a case, as illustrated in the left image of FIG. 4, in which the action of the robot 30 is a sequence (1)→(2) along the paths illustrated by the broken-line arrows, and an obstruction occurred during action (2). In such a case, in an example in which a recovery action is performed by reverse sequence execution of a path as in conventional technology, a recovery action would be performed along a path in the reverse sequence of (1)→(2), i.e. along a path (2')→(1') as illustrated in the right image of FIG. 4.

Figure 5:
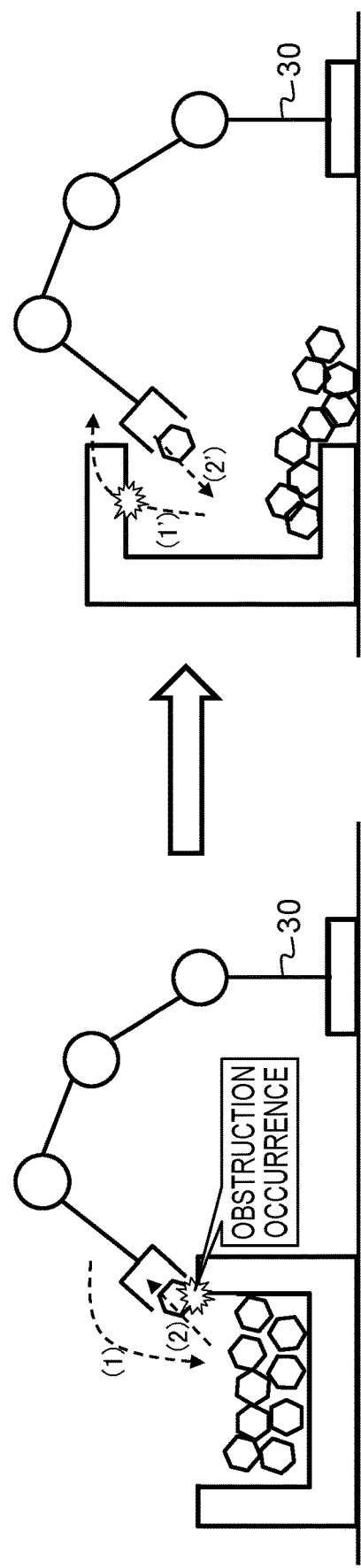
FIG. 5 is a diagram to explain problems with a recovery action performed by reverse sequence execution of a path.

However, in cases in which there has been a change in the peripheral environment due to the position or shape of an obstacle having changed after obstruction occurred as illustrated in FIG. 5, in reverse sequence execution there is a possibility of colliding again with an obstacle in a changed position. This means that sometimes a recovery action is not able to be performed safely.

Figure 6:
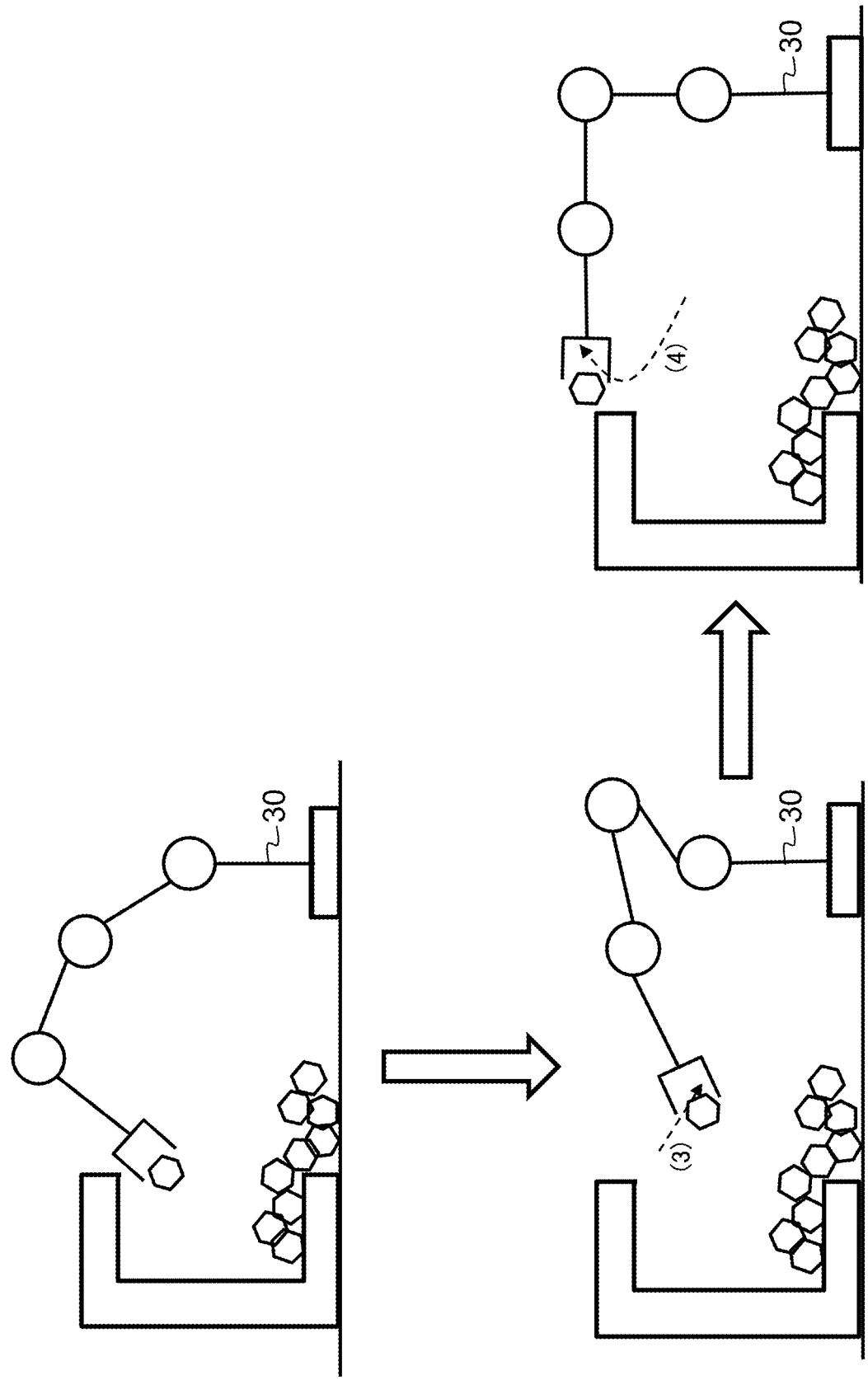
FIG. 6 is a diagram to explain recovery action in the present exemplary embodiment.

Therefore in the present exemplary embodiment, for example, a new path for recovery compatible with the peripheral environment after obstruction occurred is generated as illustrated by (3)→(4) in FIG. 6, and a recovery action is performed.

More specifically, when current pose information of the robot 30 is received from the robot 30 through the control section 14 together with notification that an obstruction occurred, the path generation section 12 acquires information regarding the environment after obstruction occurred input from the environment information input section 22, robot specification information input from the robot specification input section 24, and safe pose information input from the safe pose input section 26.

Based on the acquired environment information, the path generation section 12 identifies the position and shape of the obstacle (hereafter referred to as "obstacle information") after obstruction occurred. More specifically, the path generation section 12 identifies information regarding obstacles present at the periphery of the robot 30 after obstruction occurred based on the point cloud data, i.e. the measurement results of the 3D-sensor 35 acquired as environment information after obstruction occurred. For example, point cloud data segmented into each specific range may be input to a pre-trained classifier, and obstacle information obtained as a recognition result.

Moreover, the path generation section 12 acquires 3D-information representing the shapes and positions of obstacles present at the periphery of the robot 30 prior to obstruction occurrence, for example CAD data employed in path generation for normal action. The path generation section 12 may identify information about obstacles present at the periphery of the robot 30 after obstruction occurred by performing matching of the shape of each of the obstacles included in the CAD data against the point cloud data, while rotating and moving the shape. Known shape data may be employed in such cases, and so this enables the obstacle information to be identified with better precision than cases in which the obstacle information is identified with the point cloud data alone.

Moreover, the obstacle information after obstruction occurred may be identified by the path generation section 12 based on matching results of the CAD data for portions of obstacles represented in the CAD data matching the point cloud data, and the obstacle information after obstruction occurred may be identified by the path generation section 12 based on the point cloud data for portions of the point cloud data where there is no matching CAD data. Such an approach enables the obstacle information to be identified with good precision for the portions where CAD data can be utilized, and moreover enables the processing load to be reduced in comparison to cases using the point cloud data alone for obstacle information identification across all ranges.

Note that from out of the obstacles represented by the CAD data prior to obstruction occurrence, any obstacles for which there is no portion matching in the point cloud data after obstruction occurred are assumed to have been changed in shape due to the occurrence of the obstruction.

The path generation section 12 generates a path of the robot 30 from the current pose to a safe pose based on the identified obstacle information, on the acquired robot specification information and safe pose information, and on the notified current pose information. A path planning technique such as, for example, rapidly-exploring random tree (RRT), probabilistic road map (PRM), or the like may be employed in path generation. The path generation section 12 passes information regarding the generated path to the control section 14.

In this manner, environment information is re-acquired after obstruction occurred, and a path is generated to recover to a safe pose in consideration of the identified obstacle information after obstruction occurred so as to enable a recovery action to be performed safely.

When notified from the robot 30 of the current pose information together with notification that an obstruction has occurred, the control section 14 notifies the path generation section 12 with the current pose information and notification that an obstruction has occurred. The control section 14 also controls a recovery action based on the path generated by the path generation section 12 such that the robot 30 adopts a safe pose.

Next explanation follows regarding operation of the robot control system 100 according to the first exemplary embodiment.

Figure 7:
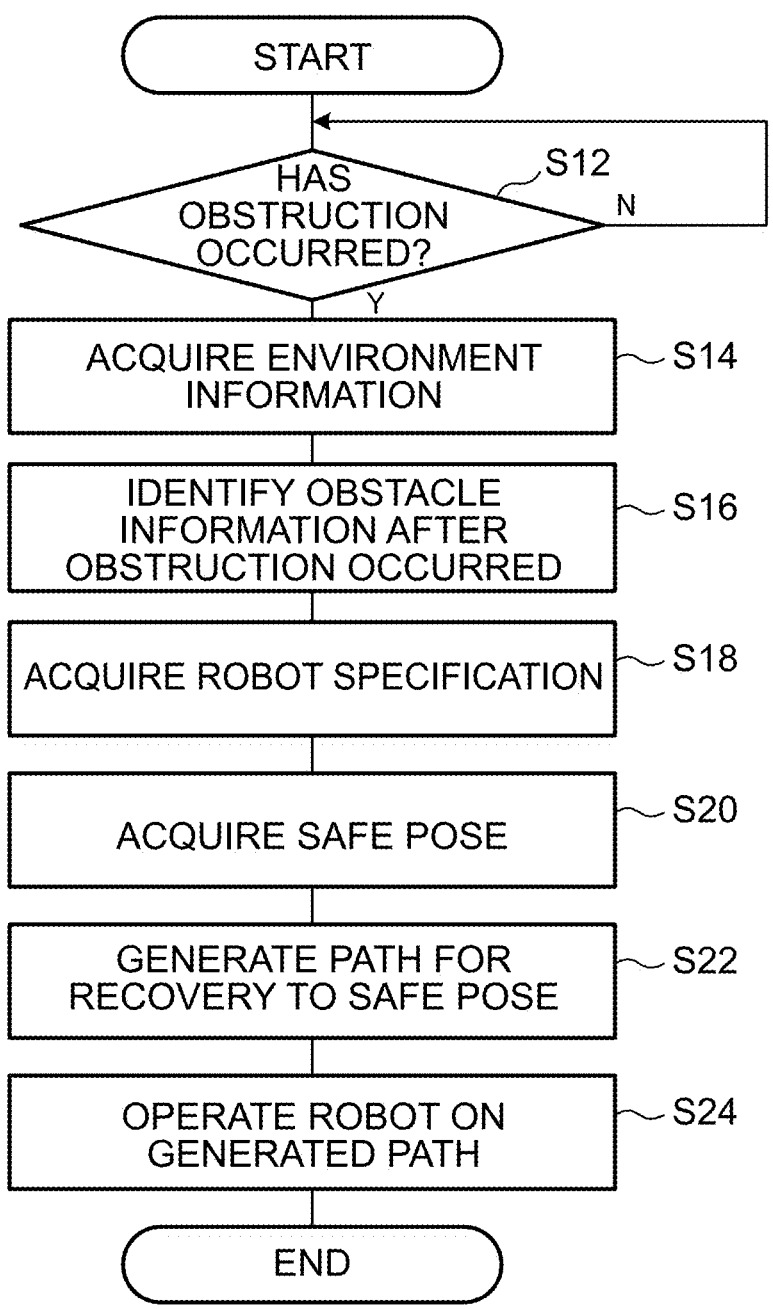
FIG. 7 is a flowchart illustrating an example of robot control processing in the first exemplary embodiment.

The robot control processing for the robot 30 as illustrated in FIG. 7 is executed when performing a normal action such as pick-and-place of a workpiece or the like.

FIG. 7 is a flowchart illustrating a flow of robot control processing executed by the CPU 42 of the robot control device 10. The CPU 42 functions as each functional configuration of the robot control device 10 by the CPU 42 reading the robot control program from the storage device 46, expanding the program in the memory 44 and executing the program, such that the robot control processing illustrated in FIG. 7 is accordingly executed. Note that the robot control processing is an example of a robot control method of the present invention.

First, at step S12, the control section 14 determines whether or not an obstruction has occurred by determining whether or not it has been notified from the robot 30 with the current pose information together with notification that an obstruction has occurred. The determination of the present step is repeated in cases in which an obstruction has not occurred, and in cases in which an obstruction has occurred the control section 14 notifies the path generation section 12 with the current pose information and notification that an obstruction has occurred, and processing transitions to step S14.

At step S14, the path generation section 12 acquires the environment information after obstruction occurred as input from the environment information input section 22.

Next, at step S16, the path generation section 12 identifies the obstacle information (shape and position) after obstruction occurred based on the acquired environment information.

Next, at step S18, the path generation section 12 acquires the robot specification information input from the robot specification input section 24. Note that the robot specification information does not change between before and after obstruction occurred, and so in cases in which the robot specification information already acquired when a normal path is generated has been stored in a specific region of the robot control device 10, this robot specification information may be read out.

Next, at step S20, the path generation section 12 acquires the safe pose information input from the safe pose input section 26. Note that in cases in which recovery is made to a predetermined safe pose irrespective of the circumstances of obstruction, the safe pose information therefor is pre-stored in a specific region of the robot control device 10, and this safe pose information may be read out.

Note that a processing sequence of step S14 and step S16, step S18, and step S20 is not limited to the example illustrated in FIG. 7, and any of the above may be executed first, or they may be executed in parallel.

Next, at step S22, the path generation section 12 generates a path of the robot 30 from the current pose to a safe pose using, for example, a path planning technique. The path generation is based on the obstacle information identified above at step S16, the robot specification information acquired above at step S18, the safe pose information acquired above at step S20, and the current pose information notified above at step S12.

Next, at step S24, the control section 14 controls a recovery action based on the path generated by the path generation section 12 at step S22 so as to place the robot 30 in a safe pose, and then ends the robot control processing.

After completing the recovery action, processing according to the application may be executed, such as restarting normal action, temporarily stopping normal action, or the like.

As explained above, with the robot control system 100 according to the first exemplary embodiment, the robot control device 10 re-acquires the environment information after obstruction occurred, and generates a path to recover to a safe pose in consideration of the identified shape and position of the obstacles after obstruction occurred. This accordingly enables recovery to be made from an obstructed state to a safe pose in a short period of time without colliding again or causing a tripping a limit switch again, and also without needing careful operation by a skilled user.

Second Exemplary Embodiment

Next, description follows regarding a second exemplary embodiment. Note that in a robot control system according to the second exemplary embodiment, the same or equivalent configuration elements and parts to the robot control system 100 according to the first exemplary embodiment are allocated the same reference numerals, and detailed explanation thereof will be omitted.

As illustrated in FIG. 1, a robot control system 200 according to the second exemplary embodiment is configured including a robot control device 210, an operation terminal 20, a robot 30, and a 3D-sensor 35.

Figure 8:
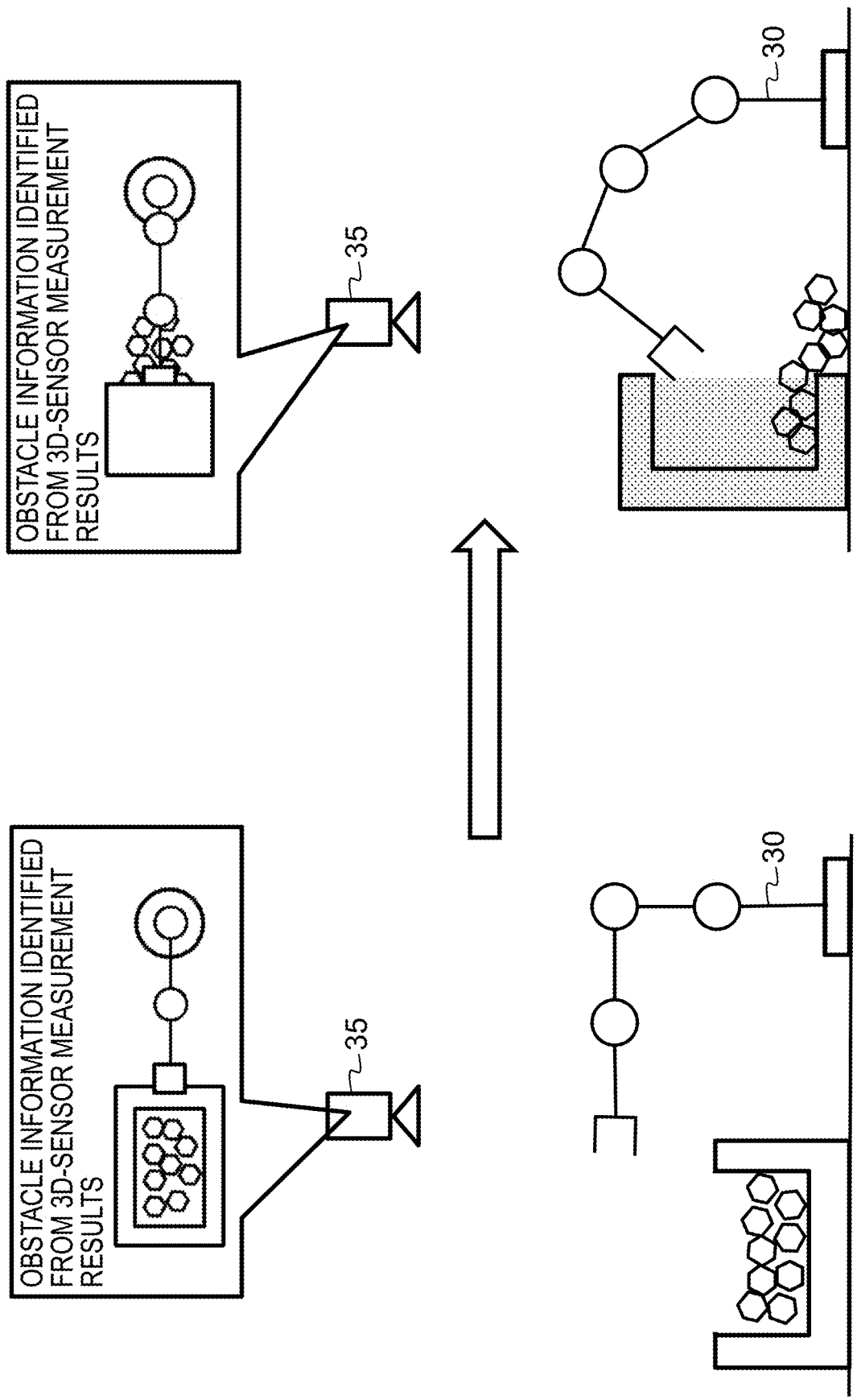
FIG. 8 is a diagram to explain occurrence of occlusion.

Explanation has been given in the first exemplary embodiment regarding a case in which environment information is re-acquired after obstruction occurred, however sometimes an occlusion area where point cloud data is not measureable by the 3D-sensor 35 arises after obstruction occurred. For example, as illustrated on the left in FIG. 8, although measurement results are obtainable for the whole task space prior to obstruction occurrence, a box may fall over due to the obstruction occurring, and so sometimes, as illustrated on the right in FIG. 8, a state arises in which measurement results are not obtainable inside the box due to occlusion (the shaded portion in FIG. 8).

The second exemplary embodiment also considers occurrence of such occlusion areas, and generates a path to recover to a safe pose in consideration of the identified obstacle information after obstruction occurred.

Explanation follows regarding a functional configuration of the robot control device 210 according to the second exemplary embodiment. Note that a hardware configuration of the robot control device 210 according to the second exemplary embodiment is similar to the hardware configuration of the robot control device 10 according to the first exemplary embodiment illustrated in FIG. 2, and so explanation thereof will be omitted.

Figure 9:
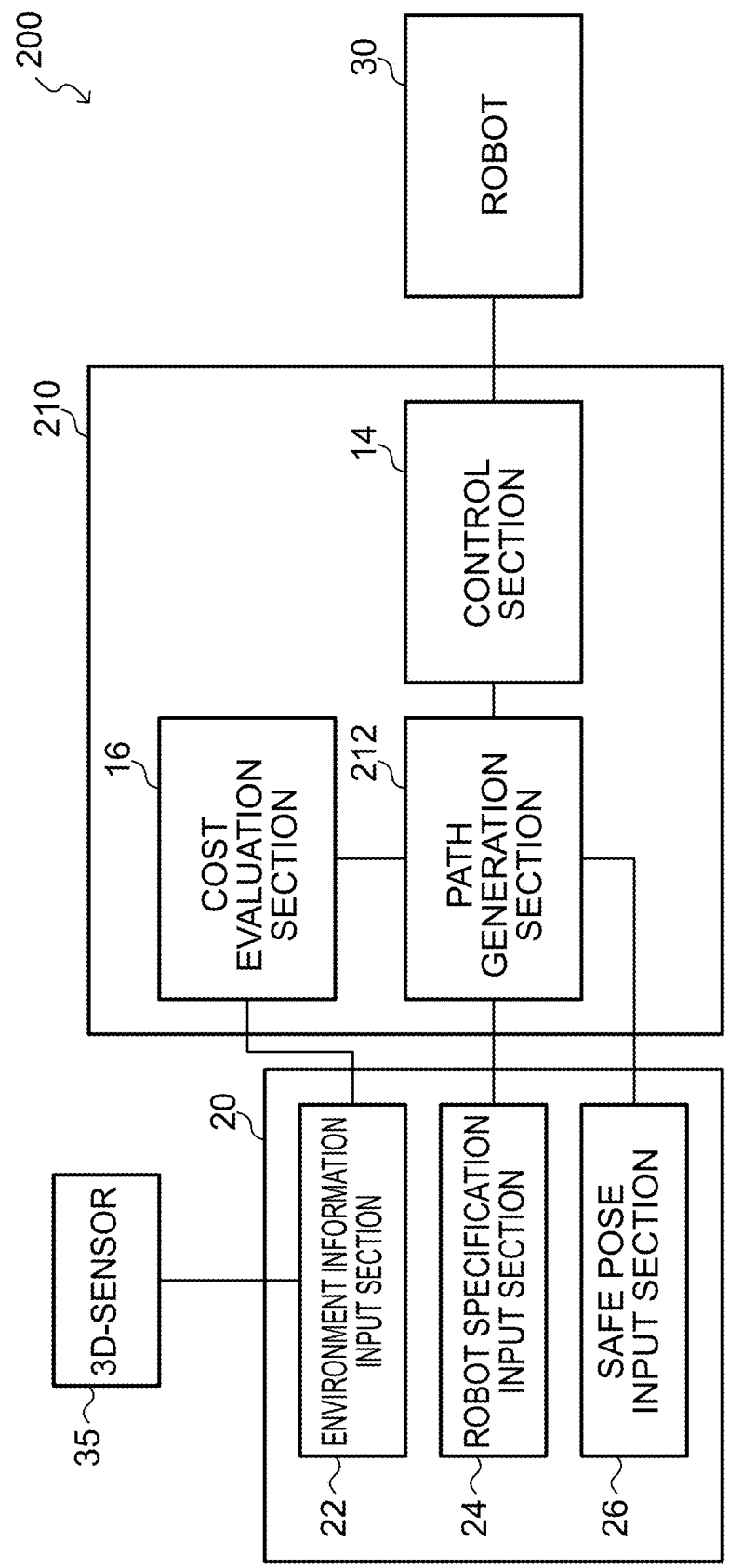
FIG. 9 is a functional block diagram of a robot control system according to the second exemplary embodiment.

FIG. 9 is a block diagram illustrating an example of a functional configuration of a robot control system 200. As illustrated in FIG. 9, the robot control device 210 includes, as functional configuration, a path generation section 212, a control section 14, and a cost evaluation section 16. Note that the path generation section 212 and the cost evaluation section 16 are examples of a generation section of the present invention.

The cost evaluation section 16 acquires environment information from the environment information input section 22, and identifies obstacle information at the periphery of the robot 30 based on the acquired environment information. The method to identify obstacle information is similar to the identification method of the path generation section 12 of the first exemplary embodiment.

Moreover, the cost evaluation section 16 identifies an occlusion area based on the identified obstacle information. Note that the occlusion area is a first example of an obstacle candidate region of the present invention. For example, in cases in which the CAD data has been matched to the point cloud data and obstacle information identified, the movement and rotation etc. of the obstacle can be ascertained so as to also enable an occlusion area to be identified. For example, in the example of FIG. 8, the fallen over state of the box is ascertained by matching CAD data of the box to the point cloud data, enabling the inside of the box to be identified as an occlusion area from the shape of the box based on the CAD data.

The cost evaluation section 16 computes a cost to evaluate whether or not there is an obstacle present in the identified occlusion area. More specifically, the cost evaluation section 16 sets a cost according to the possibility of an obstacle being present for each region at the periphery of the robot 30.

Figure 10:
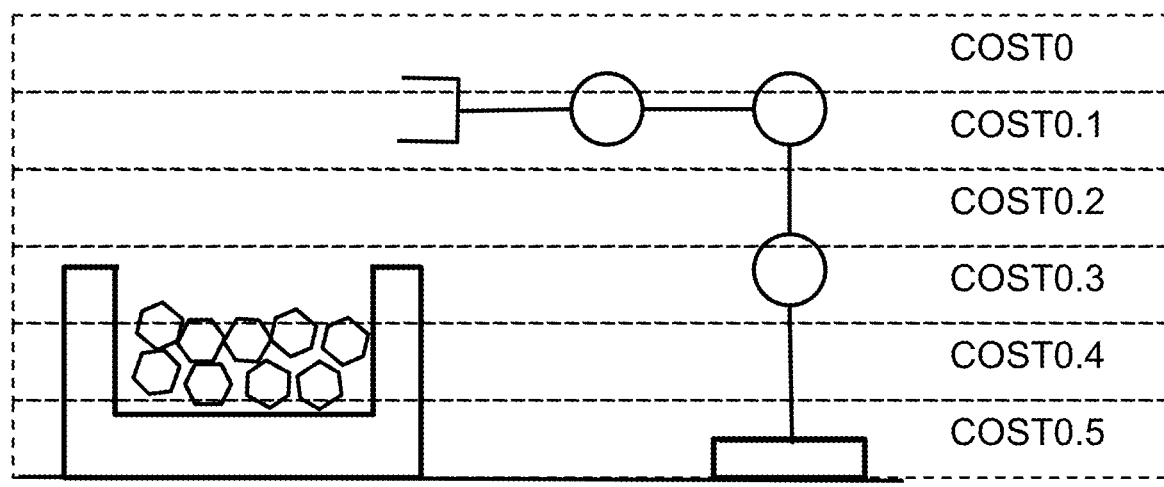
FIG. 10 is an example of setting a cost.
Figure 11:
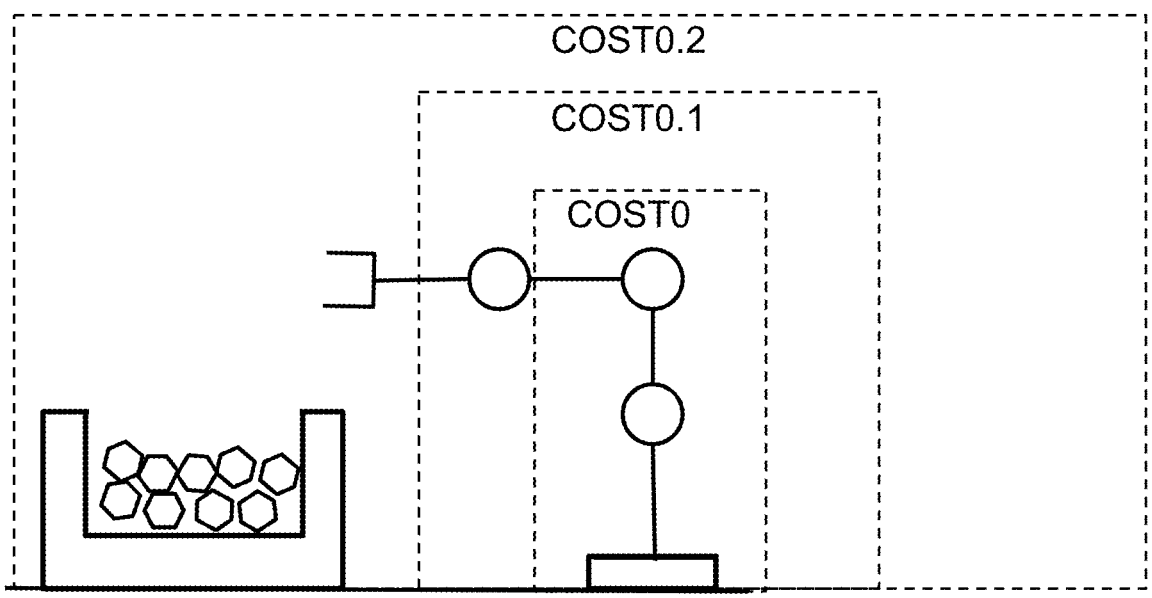
FIG. 11 is a diagram illustrating another example of setting a cost.

For example, under the assumption that there is a higher possibility of an obstacle being present nearer to the floor and a lower possibility of an obstacle being present in the air, a cost can be set so as to be higher for regions nearer to the floor surface, as illustrated in FIG. 10. Moreover, for example, under the assumption that there is a lower possibility of an obstacle being present at a position nearer to the center of the robot 30, a cost can be set so as to be lower for regions nearer to the robot 30, as illustrated in FIG. 11. Note that in the present exemplary embodiment higher costs represent a higher possibility of an obstacle being present. The cost of each region may be set with a single pattern, or may be set with plural patterns. The present exemplary embodiment will consider a case in which the cost is set with the pattern illustrated in FIG. 10 and the pattern illustrated in FIG. 11.

Figure 12:
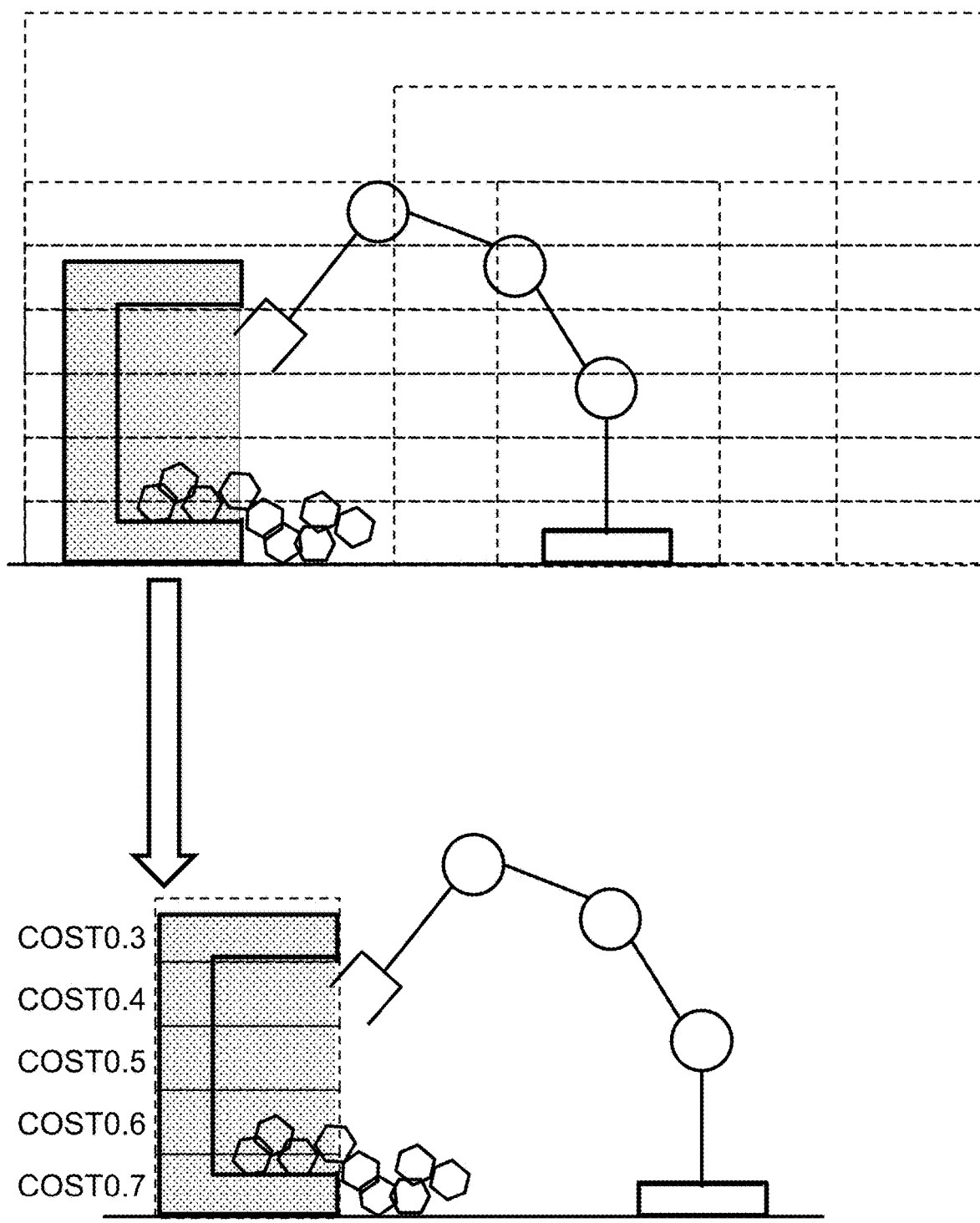
FIG. 12 is a diagram to explain computation of cost of an occlusion area.
Figure 13:
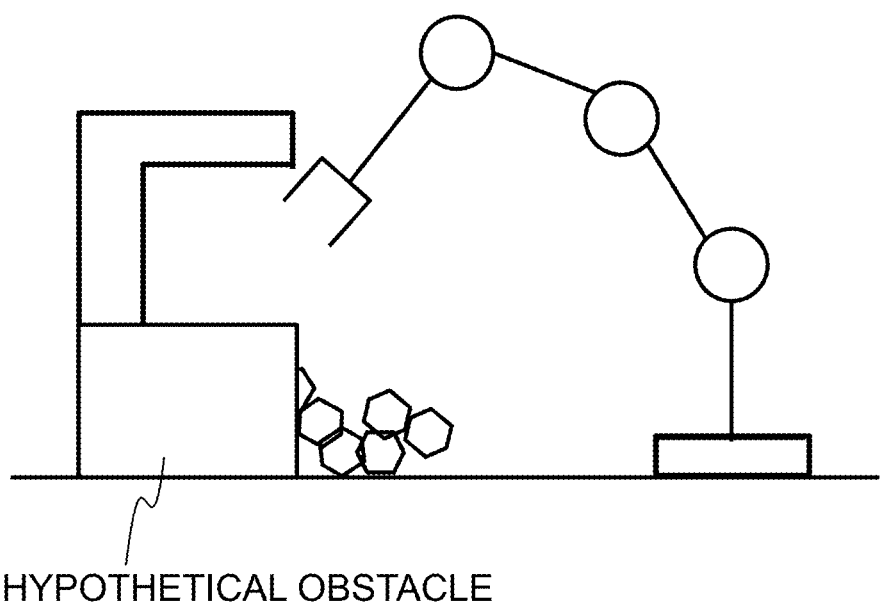
FIG. 13 is a diagram to explain setting a hypothetical obstacle.

The cost evaluation section 16, for example as illustrated in FIG. 12, computes a cost of an occlusion area by adding together the costs set for each region. Moreover, the cost evaluation section 16 evaluates an obstacle as not being present in an occlusion area where the cost is a predetermined threshold or lower. However, the cost evaluation section 16 evaluates an obstacle to be present in an occlusion area where the cost exceeds the threshold. For example as illustrated in FIG. 13, a hypothetical obstacle is set with a shape corresponding to such a region (for example, a cuboidal shape or the like).

The cost evaluation section 16 adds obstacle information for the hypothetical obstacle thus set to the obstacle information for the actual obstacles, and passes this obstacle information for the periphery of the robot 30 after obstruction occurred across to the path generation section 212.

The path generation section 212 acquires the obstacle information identified by the cost evaluation section 16, the robot specification information input from the robot specification input section 24, the safe pose information input from the safe pose input section 26, and the current pose information of the robot 30 notified from the control section 14. The path generation section 212 then generates a path to recover from the current pose to a safe pose based on the acquired information.

Figure 14:
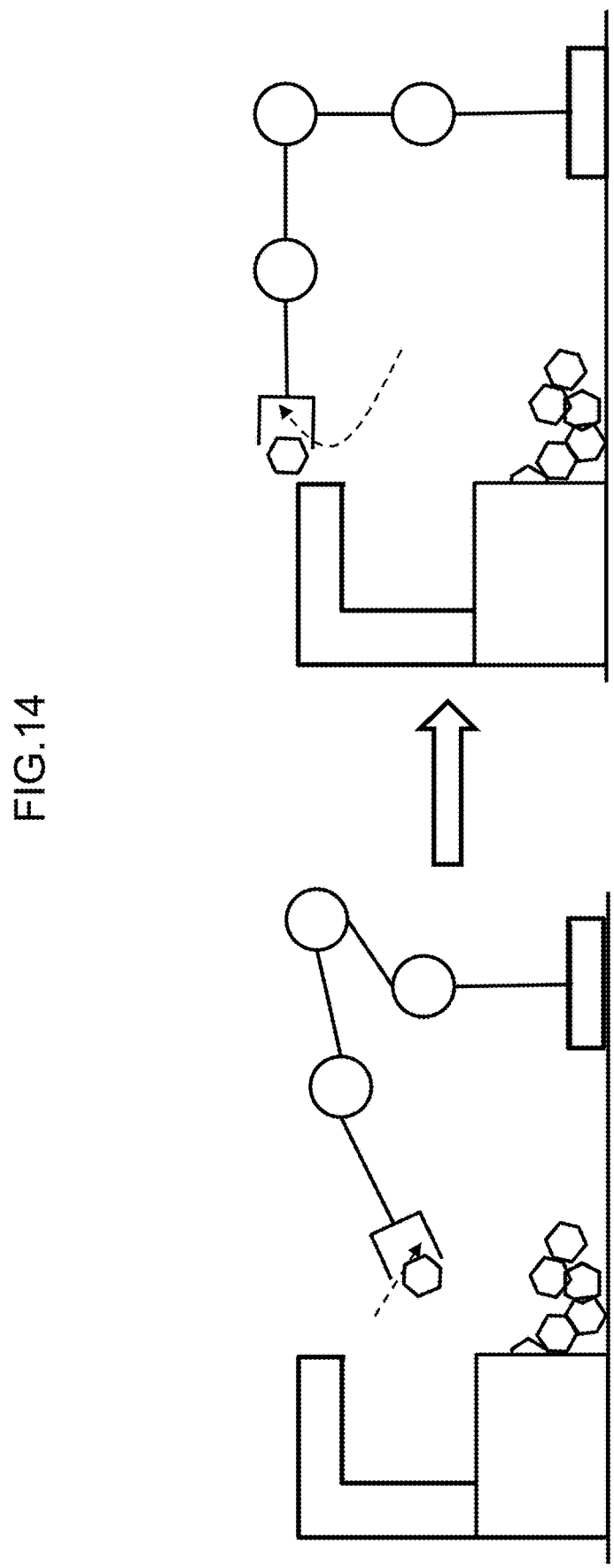
FIG. 14 is a diagram to explain generation of a path for a recovery action in the second exemplary embodiment.

In the second exemplary embodiment, the obstacle information identified includes the hypothetical obstacle as described above. Thus for example as illustrated in FIG. 14, a path for a recovery action is generated avoiding not only actual obstacles, but also avoiding a region of the occlusion area where there is a higher possibility of an obstacle being present.

Figure 15:
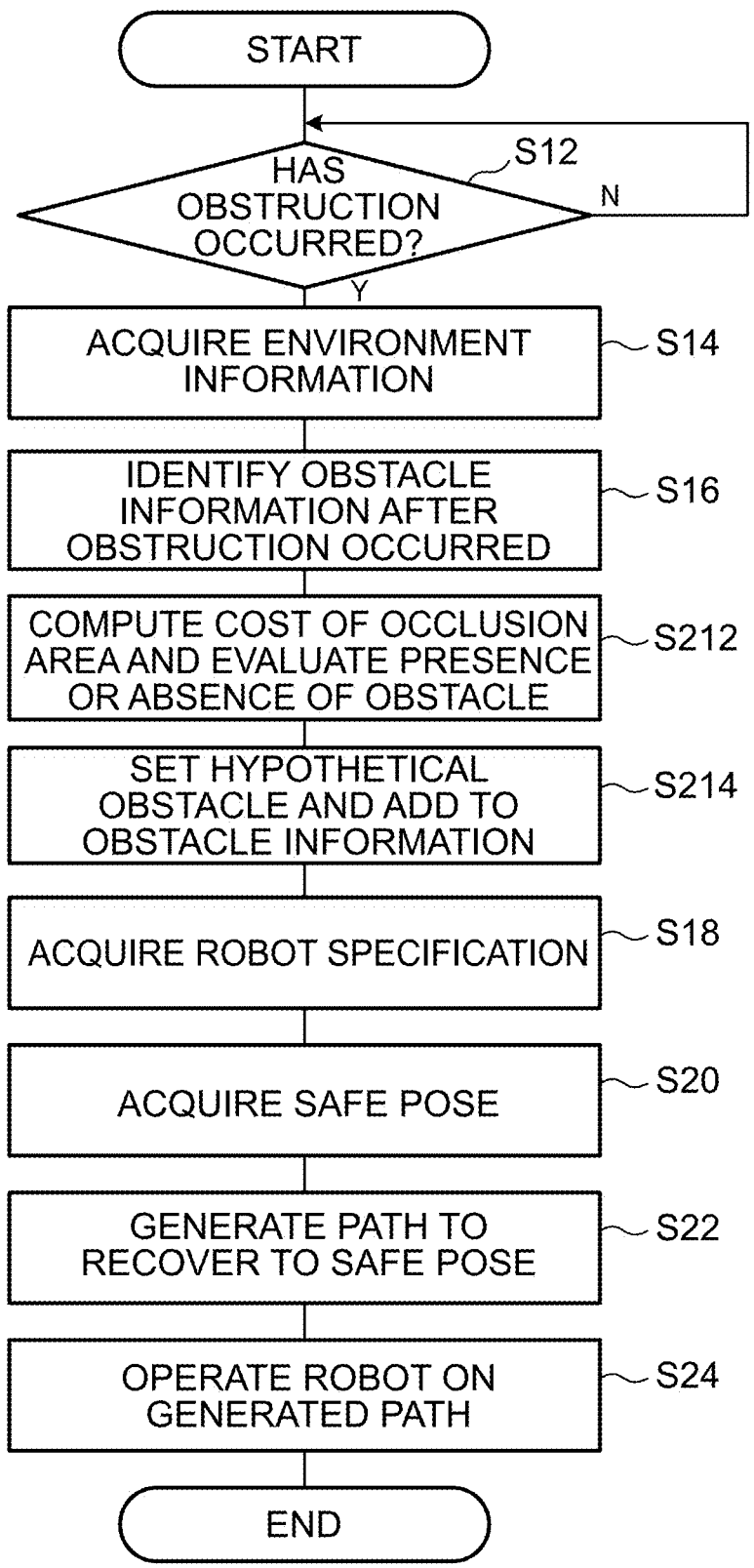
FIG. 15 is a flowchart illustrating an example of robot control processing in the second exemplary embodiment.

Next, description follows regarding operation of the robot control system 200 according to the second exemplary embodiment. In the second exemplary embodiment, robot control processing as illustrated in FIG. 15 is executed in the robot control device 210. Note that similar processing of the robot control processing in the second exemplary embodiment to the robot control processing in the first exemplary embodiment (FIG. 7) is appended with the same step number, and detailed explanation thereof will be omitted.

When processing has proceeded through step S12 to step S16 and transitioned to step S212, the cost evaluation section 16 identifies an occlusion area based on the obstacle information for actual obstacles identified at step S14, and computes a cost to evaluate whether or not there is an obstacle present in the identified occlusion area. The cost evaluation section 16 evaluates there to be no obstacle present in an occlusion area where the cost is the predetermined threshold or lower, and evaluates an obstacle to be present in an occlusion area where the cost exceeds the threshold.

Next, at step S214, the cost evaluation section 16 sets a hypothetical obstacle having a shape (for example, a cuboidal shape) corresponding to a region of the occlusion area evaluated as having an obstacle present, adds obstacle information for the set hypothetical obstacle to the obstacle information of actual obstacles identified at step S16, and passes the obstacle information at the periphery of the robot 30 after obstruction occurred to the path generation section 212.

Then step S18 to step S24 are executed similarly to in the first exemplary embodiment, and the robot control processing is ended.

As explained above, in the robot control system 200 according to the second exemplary embodiment, the robot control device 210 re-acquires environment information after obstruction occurred that also considers an occlusion area arising, and generates a path to recover to a safe pose in consideration of the identified shape and position of the obstacles after obstruction occurred. This thereby enables efficient generation of a safe path flexibly adapted to areas such as an area where a new obstacle is likely to appear due to collapse of an obstacle during the robot action (a region where the cost exceeds the threshold), and an area that although not measurable by the 3D-sensor, such as under a desk, is an area where an obstacle is clearly not present (a region where the cost is the threshold or lower).

Third Exemplary Embodiment

Explanation follows regarding a third exemplary embodiment. Note that in a robot control system according to the third exemplary embodiment, the same or equivalent configuration elements and parts to the robot control system 100 according to the first exemplary embodiment are allocated the same reference numerals, and detailed explanation thereof will be omitted.

As illustrated in FIG. 1, the robot control system 300 according to the third exemplary embodiment is configured including a robot control device 310, an operation terminal 20 equipped with a display section 28, a robot 30, and a 3D-sensor 35.

Explanation follows regarding a functional configuration of the robot control device 310 according to the third exemplary embodiment. Note that a hardware configuration of the robot control device 310 according to the third exemplary embodiment is similar to the hardware configuration of the robot control device 10 according to the first exemplary embodiment illustrated in FIG. 2, and so explanation thereof will be omitted.

Figure 16:
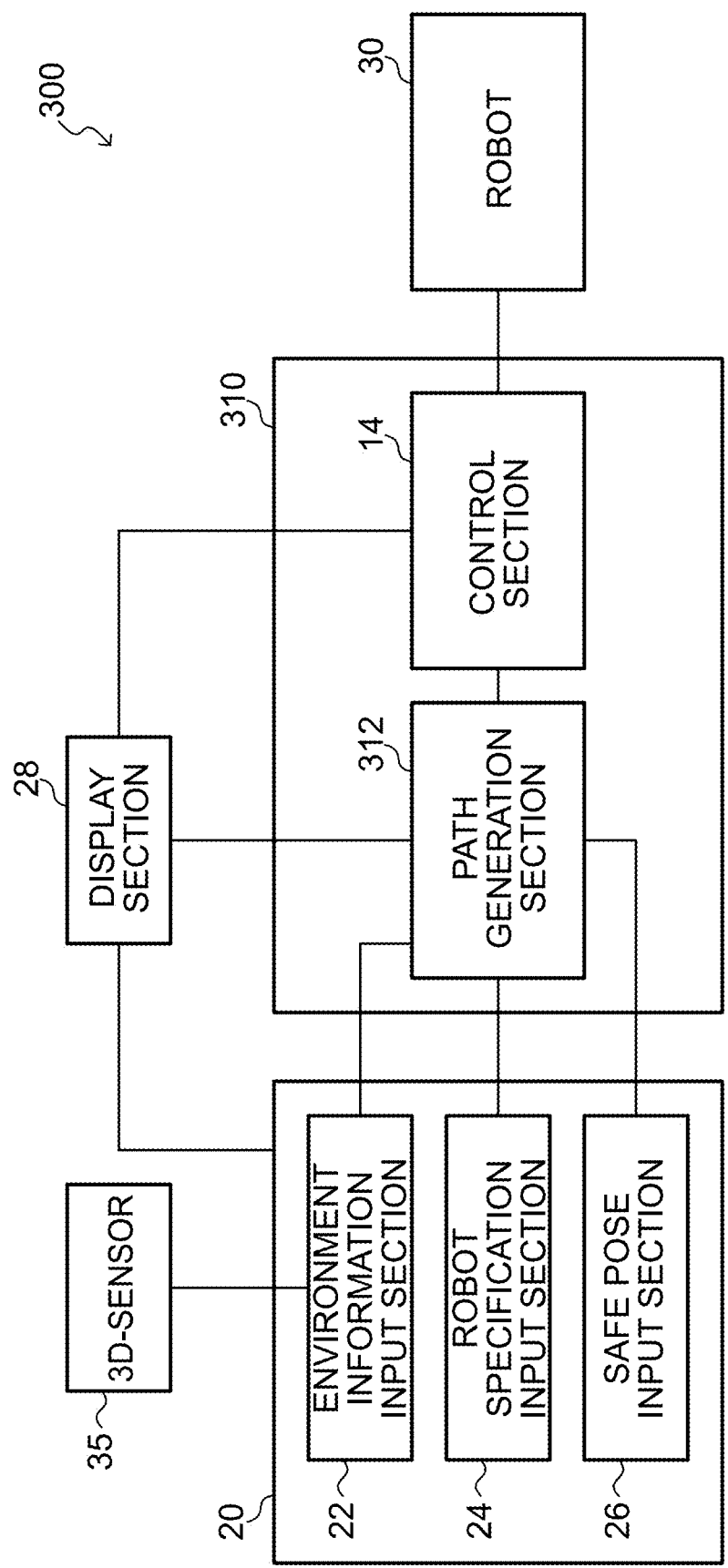
FIG. 16 is a functional block diagram of a robot control system according to the third exemplary embodiment.

FIG. 16 is a block diagram illustrating an example of a functional configuration of a robot control system 300. As illustrated in FIG. 16, the robot control device 310 includes a path generation section 312 and a control section 14 as functional configuration. Note that the path generation section 312 is an example of a generation section of the present invention.

Similarly to the path generation section 12 of the first exemplary embodiment, the path generation section 312 also generates a path to recover from a current pose to a safe pose. The path generation section 312 generates a message related to the cause of not being able to generate a path in cases in which a path is unable to be generated due to a cause such as there being no path present capable of avoiding obstacles, the robot 30 being locked when obstruction occurred, or the like. For example, a message such as "Unable to generate path capable of avoiding obstacles. Please remove obstacles" or the like is generated in cases in which a path is unable to be generated due to there being no path present capable of avoiding obstacles.

The path generation section 312 displays on the display section 28 a generated path or a message, and when a path is generated also displays obstacle information regarding identified obstacles present at the periphery of the robot 30 after obstruction occurred.

Figure 17:
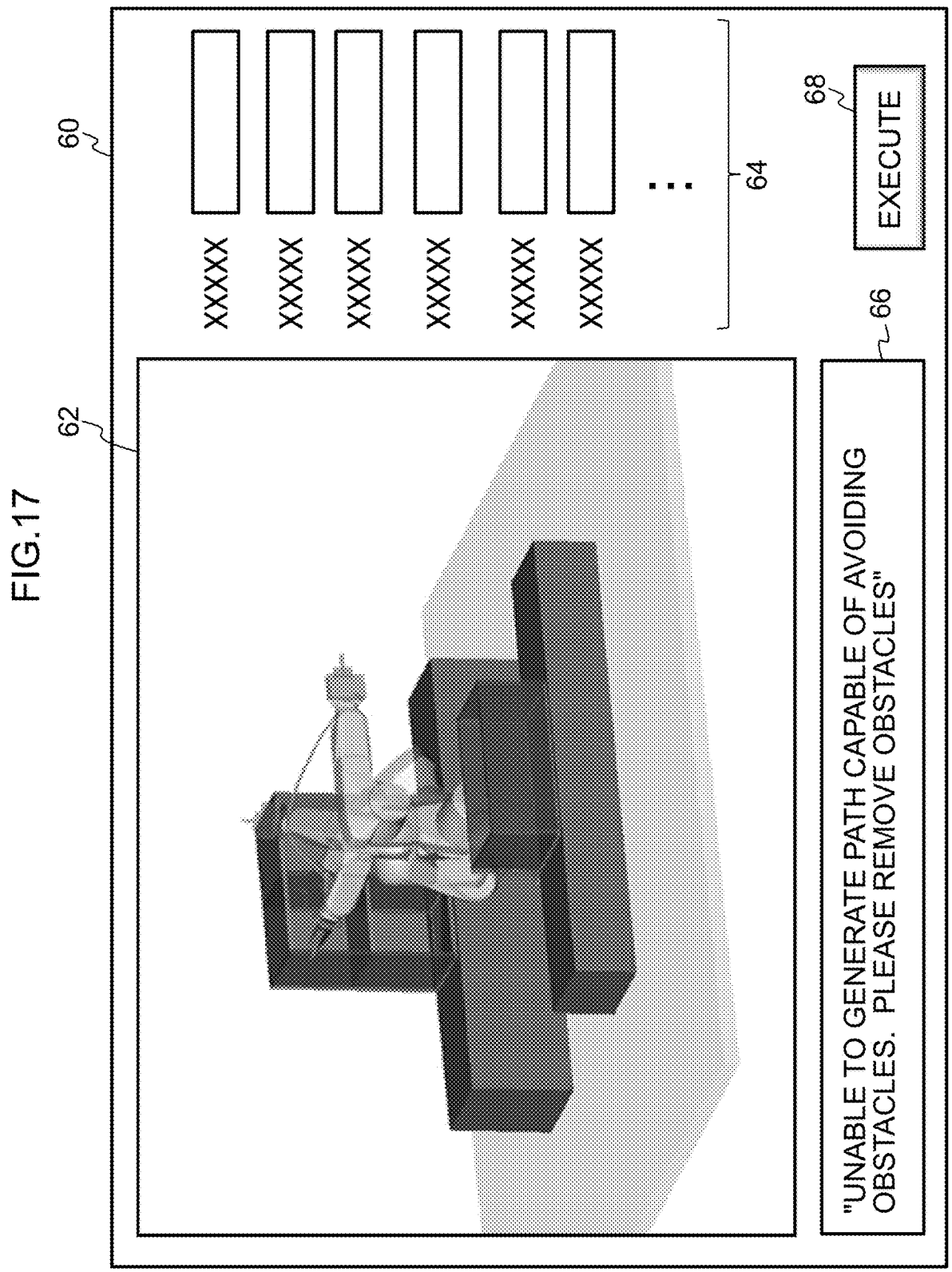
FIG. 17 is a diagram illustrating an example of a display screen.

FIG. 17 is a diagram illustrating an example of a display screen 60 for display on the display section 28. The display screen 60 includes a display region 62 to display, as a 3D-animation, obstacle information, and a result of simulation of the robot 30 action based on the generated path. The display screen 60 includes an input region 64 with various parameters for receiving corrections to at least one item being displayed on the display region 62 from out of the path or the obstacle information.

Corrected values and the like are input by a user to the input region 64 through the environment information input section 22, the robot specification input section 24, and the safe pose input section 26. For example, in cases in which a path is generated so as to pass through in a region where an obstacle is present, information to input to correct the path. Moreover correct obstacle information is input in cases in which, for example, there is an error in the identified obstacle information, such as a measurement error by the 3D-sensor 35, or a recognition error when identifying obstacles from point cloud data. Note that a configuration may be adopted in which correction can be received by a drag operation or the like on the display region 62.

Furthermore, the display screen 60 also includes a message region 66 to display messages generated by the path generation section 312, and an execution button 68 selected to permit the robot 30 action along the generated path.

Correction to at least one out of the path or the obstacle information input through the input region 64 is input to the path generation section 312 through the environment information input section 22, the robot specification input section 24, and the safe pose input section 26. The path generation section 312 accordingly re-generates a path based on the corrected information.

Moreover, a user performs countermeasures according to the message being displayed on the message region 66, such as removing an obstacle or unlocking the robot 30. When a command indicating countermeasures have been completed has been input through the operation terminal 20, the environment information is re-measured after countermeasure completion by the 3D-sensor 35 and input to the path generation section 312 through the environment information input section 22. The path generation section 312 accordingly re-generates a path based on the environment information after countermeasure completion.

Moreover, when the execution button 68 has been selected, a notification to permit the robot 30 action along the generated path is notified from the display section 28 to the control section 14, and the robot 30 action is controlled by the control section 14.

Figure 18:
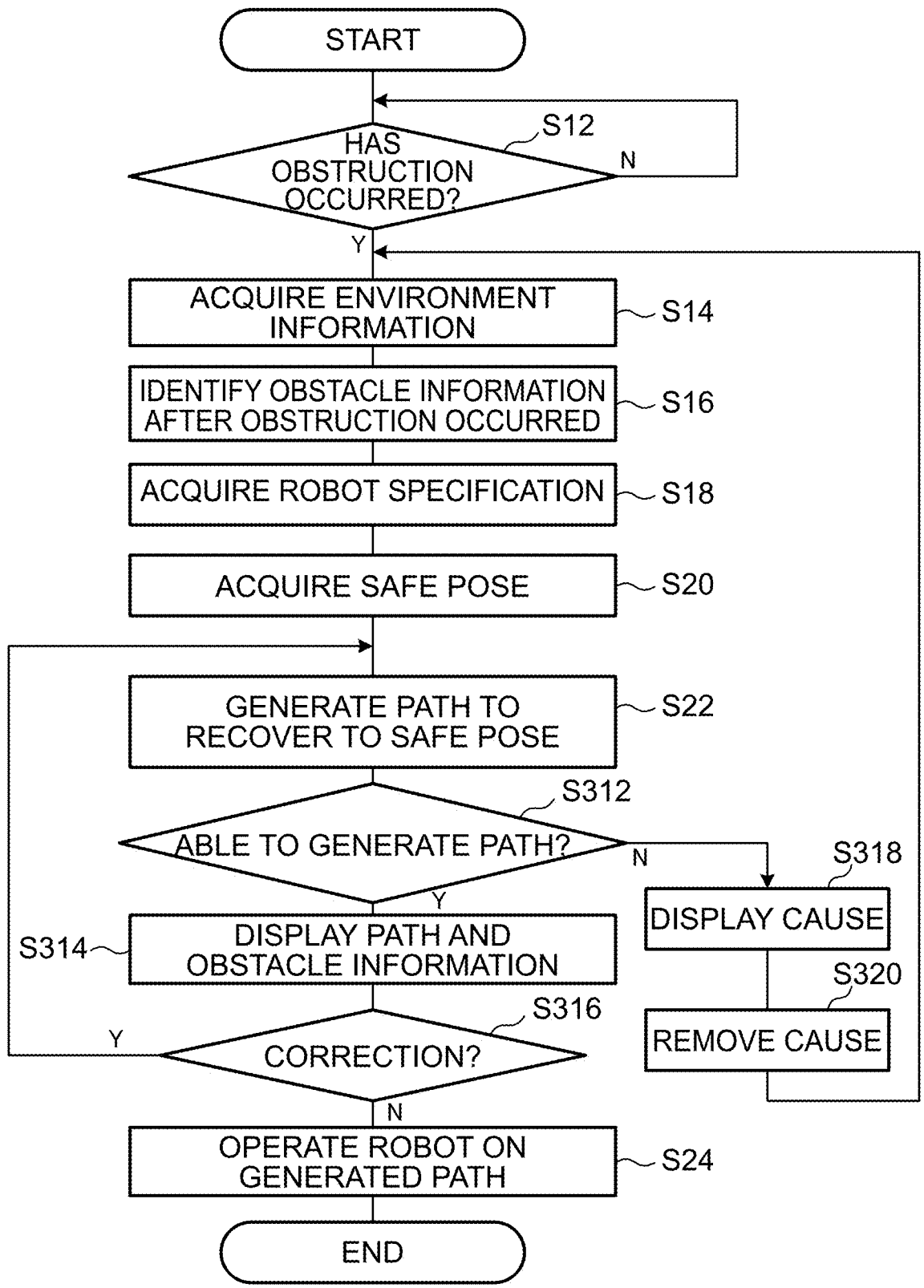
FIG. 18 is a flowchart illustrating an example of robot control processing in the third exemplary embodiment.

Next, description follows regarding operation of the robot control system 300 according to the third exemplary embodiment. In the third exemplary embodiment, the robot control processing as illustrated in FIG. 18 is executed in the robot control device 310. Note that processing in the robot control processing of the third exemplary embodiment similar to the robot control processing of the first exemplary embodiment (FIG. 7) is appended with the same step number and detailed explanation thereof will be omitted.

The path generation section 312 executes path generation through steps S12 to S22, and at the next step S312 determines whether or not a path was able to be generated. Processing transitions to step S314 in cases in which a path was able to be generated, and processing transitions to step S318 in cases in which a path could not be generated.

At step S314, the path generation section 312 displays on the display section 28 the display screen 60, including the path generated at step S22 and content related to the obstacle information as identified at step S16.

Next, at step S316, the operation terminal 20 determines whether or not the operation terminal 20 has received correction to the content displayed on the display screen 60. Processing returns to step S22 in cases in which correction has been received, and the path generation section 312 then re-generates a path based on the corrected information. However, in cases in which there is either no correction or correction has ended, the execution button 68 is on the display screen 60 for a selection by a user.

Processing thereby transitions to step S24, the robot 30 action along the generated path is permitted by notification from the display section 28 to the control section 14, and the robot 30 action is controlled by the control section 14.

Moreover, at step S318, the path generation section 312 generates a message related to the cause of not being able to generate a path, and displays the display screen 60 including the generated message in the message region 66 on the display section 28.

Next processing returns to step S14 when a command has been input from the operation terminal 20 at step S320 to indicate completion of countermeasures according to the message displayed in the message region 66, such as removal of the cause.

As described above, in the robot control system 200 according to the third exemplary embodiment, the robot control device 310 displays the path generated based on the environment information after obstruction occurred and the obstacle information, and receives correction from a user. Moreover, the cause is presented to the user in cases in which a path was unable to be generated, prompting countermeasures such as removing the cause. This enables the user to confirm the robot action before execution of a recovery action by the robot, and after correction has been performed in cases in which correction is necessary, enables path re-generation to be instructed, the cause is removed, or the like.

Note that although in the third exemplary embodiment various display on a display section, receipt of corrections, and the like have been described as a configuration added to the first exemplary embodiment, application may also be made to the second exemplary embodiment.

Moreover, although in the third exemplary embodiment a case has been described in which the path and the like are displayed on the display section 28 provided to the operation terminal 20, a configuration may be adopted in which the display section 28 is a display device independent from the operation terminal 20.

Moreover, although in the above exemplary embodiments cases have been described in which the path is generated by path planning, there is no limitation thereto, and a path may be generated based on results of pre-training.

Moreover, although the above exemplary embodiments describe controlling a vertical articulated robot, the present invention is not limited to a vertical articulated robot, and is applicable to any freely selected open-loop robot. Moreover, applicability is also to a closed-loop robot such as a delta robot. Furthermore, applicability is to a wide range of robots including to wandering link system lacking a fixed base, such as a mobile robot, a mobile manipulator, and the like.

Moreover, although examples have been described in the above exemplary embodiments of cases in which the robot control device and the operation terminal are separate devices, the robot control device and the operation terminal may be configured by a single information processing device. Moreover, each of the functional configurations of the robot control device may be implemented by different respective devices, and the robot control processing described above may be implemented as distributed processing.

Moreover, the robot control processing executed by a CPU reading software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The robot control processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, although explanation has been given regarding an implementation in which the robot hand control program is pre-stored (pre-installed) in a storage device in the exemplary embodiments described above, there is no limitation thereto. The program may be provided in a format recorded on a recording medium such as a compact disc read only memory (CD-ROM), digital versatile disc read only memory (DVD-ROM), or universal serial bus (USB) memory. Alternatively, the program may be a format downloadable from an external device over a network.

EXPLANATION OF THE REFERENCE NUMERALS 10, 210, 310 robot control device
12, 212, 312 path generation section
14 control section
16 cost evaluation section
20 operation terminal
22 environment information input section
24 robot specification input section
26 safe pose input section
28 display section
30 robot
35 3D-sensor
42 CPU
44 memory
46 storage device
48 input device
50 output device
52 optical disc drive device
54 communication interface
60 display screen
62 display region
64 input region
66 message region
68 execution button
100, 200, 300 robot control system

The invention claimed is:

1. A robot control device comprising:
a memory; and
a processor coupled to the memory, the processor being configured to perform operations comprising:
acquiring information when occurrence of an obstruction has been detected during action of a robot, the information being environment information at a periphery of the robot after the obstruction occurred, specification information of the robot, and information of a recovery-pose for the robot,
generating a path of the robot from a pose after the obstruction occurred to the recovery-pose based on the acquired information, and
controlling action of the robot based on the generated path such that the robot adopts the recovery-pose,
wherein generating the path of the robot comprises:
before identifying an obstacle candidate region, setting in advance a cost for each region at the periphery of the robot in accordance with a possibility of an obstacle being present based on a distance from at least one of a floor surface or a center of the robot,
identifying a region where the environment information after the obstruction occurred is unable to be measured as the obstacle candidate region, and
identifying whether or not an obstacle is present in the obstacle candidate region according to the cost of the obstacle candidate region.

2. The robot control device of claim 1, wherein the processor acquires 3D-measurement data representing a 3D-position of each point at the periphery of the robot as the environment information after the obstruction occurred, and identifies a shape and a position of an object present at the periphery of the robot after the obstruction occurred based on the 3D-measurement data.

3. The robot control device of claim 1, wherein the processor employs 3D-information representing a shape and a position of an object present at the periphery of the robot prior to the obstruction occurring together with the environment information acquired after the obstruction occurred to identify a shape and a position of the object present at the periphery of the robot after the obstruction occurred.

4. The robot control device of claim 3, wherein the processor acquires 3D-measurement data representing a 3D-position of each point at the periphery of the robot as the environment information after the obstruction occurred, identifies a shape and a position of the object present at the periphery of the robot based on the 3D-information for portions of the 3D-measurement data matching the 3D-information, and identifies a shape and position of the object present at the periphery of the robot based on the 3D-measurement data for portions of the 3D-measurement data where there is no matching 3D-information present.

5. The robot control device of claim 1, wherein the processor displays on a display device a shape and a position of an object present at the periphery of the robot after the obstruction occurred and also information representing the generated path.

6. The robot control device of claim 5, wherein the processor receives correction of at least one item of the path or the shape and the position of the object present at the periphery of the robot after the obstruction occurred, the at least one item being displayed on the display device.

7. The robot control device of claim 1, wherein in a case in which the path is unable to be generated, the processor displays information on a display device related to a cause of not being able to generate the path.

8. A robot control method comprising:
acquiring information when occurrence of an obstruction has been detected during action of a robot, this being environment information at a periphery of the robot after the obstruction occurred, specification information of the robot, and information of a recovery-pose for the robot;
generating a path of the robot from a pose after the obstruction occurred to the recovery-pose based on the acquired information; and
controlling action of the robot based on the generated path such that the robot adopts the recovery-pose,
wherein generating the path of the robot comprises:
before identifying an obstacle candidate region, setting in advance a cost for each region at the periphery of the robot in accordance with a possibility of an obstacle being present based on a distance from at least one of a floor surface or a center of the robot,
identifying a region where the environment information after the obstruction occurred is unable to be measured as the obstacle candidate region, and
identifying whether or not an obstacle is present in the obstacle candidate region according to the cost of the obstacle candidate region.

9. The robot control method of claim 8, further comprising:
acquiring 3D-measurement data representing a 3D-position of each point at the periphery of the robot as the environment information after the obstruction occurred; and
identifying a shape and a position of an object present at the periphery of the robot after the obstruction occurred based on the 3D-measurement data.

10. The robot control method of claim 8, further comprising:
employing 3D-information representing a shape and a position of an object present at the periphery of the robot prior to the obstruction occurring together with the environment information acquired after the obstruction occurred to identify a shape and a position of the object present at the periphery of the robot after the obstruction occurred.

11. The robot control method of claim 10, further comprising:
acquiring 3D-measurement data representing a 3D-position of each point at the periphery of the robot as the environment information after the obstruction occurred;
identifying a shape and a position of the object present at the periphery of the robot based on the 3D-information for portions of the 3D-measurement data matching the 3D-information; and
identifying a shape and position of the object present at the periphery of the robot based on the 3D-measurement data for portions of the 3D-measurement data where there is no matching 3D-information present.

12. The robot control method of claim 8, further comprising:
displaying on a display device a shape and a position of an object present at the periphery of the robot after the obstruction occurred and also information representing the generated path.

13. The robot control method of claim 12, further comprising:
receiving correction of at least one item of the path or the shape and the position of the object present at the periphery of the robot after the obstruction occurred, the at least one item being displayed on the display device.

14. The robot control method of claim 8, further comprising:
in a case in which the path is unable to be generated, displaying information on a display device related to a cause of not being able to generate the path.

15. A non-transitory storage medium storing a robot control program executable by a computer to perform operations comprising:
acquiring information when occurrence of an obstruction has been detected during action of a robot, the information being environment information at a periphery of the robot after the obstruction occurred, specification information of the robot, and information of a recovery-pose for the robot;
generating a path of the robot from a pose after the obstruction occurred to the recovery-pose based on the acquired information; and
controlling action of the robot based on the generated path such that the robot adopts the recovery-pose,
wherein generating the path of the robot comprises:
before identifying an obstacle candidate region, setting in advance a cost for each region at the periphery of the robot in accordance with a possibility of an obstacle being present based on a distance from at least one of a floor surface or a center of the robot,
identifying a region where the environment information after the obstruction occurred is unable to be measured as the obstacle candidate region, and
identifying whether or not an obstacle is present in the obstacle candidate region according to the cost of the obstacle candidate region.

16. The non-transitory storage medium of claim 15, wherein the robot control program is executable by the computer to further perform operations comprising:
acquiring 3D-measurement data representing a 3D-position of each point at the periphery of the robot as the environment information after the obstruction occurred; and
identifying a shape and a position of an object present at the periphery of the robot after the obstruction occurred based on the 3D-measurement data.

17. The non-transitory storage medium of claim 15, wherein the robot control program is executable by the computer to further perform operations comprising:
employing 3D-information representing a shape and a position of an object present at the periphery of the robot prior to the obstruction occurring together with the environment information acquired after the obstruction occurred to identify a shape and a position of the object present at the periphery of the robot after the obstruction occurred.

18. The non-transitory storage medium of claim 17, wherein the robot control program is executable by the computer to further perform operations comprising:
acquiring 3D-measurement data representing a 3D-position of each point at the periphery of the robot as the environment information after the obstruction occurred;

identifying a shape and a position of the object present at the periphery of the robot based on the 3D-information for portions of the 3D-measurement data matching the 3D-information; and identifying a shape and position of the object present at the periphery of the robot based on the 3D-measurement data for portions of the 3D-measurement data where there is no matching 3D-information present.

19. The non-transitory storage medium of claim 15, wherein the robot control program is executable by the computer to further perform operations comprising:

displaying on a display device a shape and a position of an object present at the periphery of the robot after the obstruction occurred and also information representing the generated path.

20. The non-transitory storage medium of claim 19, wherein the robot control program is executable by the computer to further perform operations comprising:

receiving correction of at least one item of the path or the shape and the position of the object present at the periphery of the robot after the obstruction occurred, the at least one item being displayed on the display device.

* * * * *